Dec. 14, 1971   R. A. MUNIER ET AL   3,626,696
PNEUMATIC REMOTE READOUT SYSTEM FOR METERS
Filed Oct. 22, 1968

RONALD A. MUNIER
NORMAN L. MEYERSON
INVENTORS

BY Daniel H. Bobis
   Atty

United States Patent Office 3,626,696
Patented Dec. 14, 1971

3,626,696
PNEUMATIC REMOTE READOUT SYSTEM FOR METERS
Ronald A. Munier, New Providence, and Norman L. Meyerson, Glen Rock, N.J., assignors to Gamon-Calmet Industries, Inc., Newark, N.J.
Filed Oct. 22, 1968, Ser. No. 769,692
Int. Cl. F15b 7/00; G06m 1/00
U.S. Cl. 60— 54.5 R                                                  7 Claims

ABSTRACT OF THE DISCLOSURE

A fluidic telemetering device for the transmission of signals between input signal transmission means and remotely disposed output signal transmission means, including a hermetically sealed chamber system comprising transmitter chamber cooperatively associated with said input signal transmission means, and a receiver chamber cooperatively associated with said output signal transmission means, and balancing line means connecting said transmitter and receiver chambers, an independently hermetically sealed pressure responsive means system comprising first, variable volume pressure responsive means disposed in said transmitter chamber, second variable volume pressure responsive means disposed in said receiver chamber, and balancing line means connecting said first and second variable volume pressure responsive means, means coupling said input signal transmission means to said first variable volume pressure responsive means, and means coupling said second variable volume pressure responsive means to said output signal transmission means to transmit output signals to the latter.

BACKGROUND OF THE INVENTION

This invention relates to improvements in fluidic telemetering devices for meters.

This invention is particularly, though by no means exclusively, applicable for use in conjunction with domestic utility meters in the nature of water meters which are customarily located in the basement, or other indoor location, of the building being served thereby. A problem is presented by this indoor location of such meters in that accessibility to the building is required to enable meter reading and, as is believed obvious, such accessibility is not always readily available and esepcially in instances wherein such building is constituted by a family residence. Accordingly, it is preferable that means be provided to enable the convenient reading of said meters from without such building, despite the fact that the former are disposed within the latter.

For such use, it is, however, required that a fluidic telemetering device have a high degree of accuracy and reliability of performance, minimal servicing requirements and complete independence from electric power, be it line or battery provided, as a source of operating energy, and it is additionally required that the construction thereof should be sufficiently simple and inexpensive so that the costs of production and installation thereof are more than offset by the elimination of the necessity for repeated visits to a building to gain access thereto in order to accomplish the meter reading function.

Generally satisfactory fluidic telemetering devices for enabling the remote read-out of domestic utility meters have been developed and are available for use as exemplified by the fluidic telemetering apparatus for quantity meters disclosed in U.S. Pat. 3,352,488. Although, as set forth directly hereinabove, apparatuses of this nature are generally satisfactory for enabling the remote read-out of domestic utility meters, it may be understood that the same are characterized by certain difficulties in the areas of initial cost and operational reliability due to the somewhat undue complexity thereof. More specifically, it may be noted that such apparatuses comprise, and rely upon for the operation thereof, a total of four distinct pressure responsive means in the nature of bellows or diaphrams, each of which is of relatively high cost in that it must be of particularly precise construction and manner of operation in order to provide for apparatus function with the requisite high degree of accuracy, and each of which is, of course, susceptible to failure resulting from the repeated flexure thereof and attendant development of leaks therein to thereby present something less than the desired degree of reliability.

SUMMARY OF THE INVENTION

It is, accordingly, an object of this invention to provide a high accurate fluidic telemetering device which is particularly, though by no means exclusively, adapted for use in conjunction with quantity meters to enable the remote read-out thereof.

It is another object of this invention to provide a fluidic telemetering device which is of particularly simple design and construction in that it requires only two, rather than four, pressure responsive means in the nature of diaphrams or bellows, and is thus rendered of less expensive design and construction and significantly enhanced reliability than the similar devices of the prior art.

Another object of this invention is the provision of a fluidic telemetering device comprising chamber and pressure responsive means systems which are each hermetically sealed independent of the other.

A further object of this invention is the provision of a fluidic telemetering device wherein the respective chamber and pressure responsive means systems are completely isolated from the atmosphere and the fluid being metered, and are thus completely independent of the pressure of the fluid being metered and of atmospheric pressure.

A still further object of this invention is the provision of a fluidic telemetering device which requires no valves or orifices, and wherein the device as a whole comprises a fixed, but readily transferable, volume whereby a negligible amount of force is required to actuate or displace the pressure responsive means included in the system.

BRIEF DESCRIPTION OF THE INVENTION

Briefly described, the fluidic telemetering device of the invention comprises hermetically sealed transmitter and receiver chambers interconnected by a balancing line whereby the respective fluid pressures therein may be maintained substantially equal. A pressure responsive means is disposed in each of said chambers, and the said pressure responsive means are also interconnected by a balancing line whereby changes in the volume of one of said pressure responsive means will be accompanied by an oppositely directed change in volume in the other of said pressure responsive means, it being understood that the balancing line which connects the respective transmitter and receiver chambers will be effective to maintain substantial pressure equalization therebetween despite the respective volume changes in the said pressure responsive means. Hinged vane means are attached to each of the said pressure responsive means within the respective transmitter and receiver chambers, and are operable, in the transmitter chamber, to be moved to expand or contract the transmitter-chamber-disposed pressure responsive means, and the hinged vane means are operable, in the receiver chamber, to be moved in response to the expansion or contraction of the receiver-chamber-disposed pressure responsive means. Input signal transmission means are magnetically or otherwise coupled to the hinged vane means within or without the transmitter chamber and are thus operable to contract and expand the pressure responsive means disposed therein in response to input signals, and output signal transmission means are magnetically or otherwise coupled to the hinged vane means within or without the receiver chamber and are thus operable to receive and transmit the output signals therefrom resulting from the contraction or expansion of the bellows disposed therein. For use in conjunction with a domestic utility meter in the nature of a water meter, the input signal transmission means are attached or otherwise operably associated with the said meter to pass through one cycle of reciprocatory movement for the usage of each predetermined quantity of water, and the output signal transmission means are attached or otherwise operably associated to remotely disposed counter means in such manner as to advance the said counter means one unit for each such cycle of arm movement.

DESCRIPTION OF THE DRAWINGS

The above and other objects of this invention are believed made clear by the following detailed description thereof taken in conjunction with the accompanying drawings wherein.

DETAILED DESCRIPTION OF THE INVENTION

Figure 1:
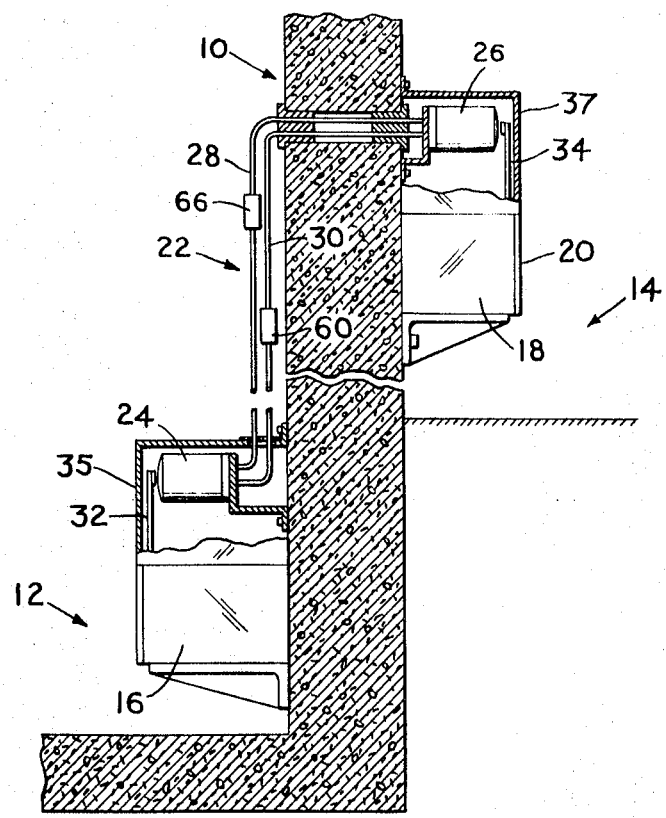
FIG. 1 is a schematic diagram of a fluidic telemetering device constructed in accordance with the principles of this invention and depicted in operative relationship with internally disposed quantity meter means and externally disposed meter read-out means.

Referring now to FIG. 1, a wall is indicated generally at 10 and may be understood to constitute a portion of the structural enclosure which forms a building having an internal area 12 in the nature of a basement, and an external area 14 in the nature of a yard or surrounding grounds. A water meter is indicated at 16 and is disposed as shown, in conventional manner, in the internal or basement area 12. The water meter 16 may, for example, take the form of those manufactured by the Gamon-Calmet division of applicants' assignee. Mechanically operable counter means 18, which may take any conventional form, are disposed as shown on the wall 10 within the external or yard area 14, and the counter means 18 include a dial face or other indicating means 20 which may readily be understood to be readable from the said external or yard area.

A fluidic telemetering device 22, constructed in accordance with the principles of this invention, is operably interposed as indicated between the internally disposed water meter 16 and the externally disposed counter means 18 and may be understood to function to transmit the water quantity utilization readings from the meter 16 to the counter means 18 to thus render unnecessary access to within the basement area 12 in order to obtain periodic readings of water quantity utilization from the meter 16.

More specifically, and referring still to FIG. 1, the fluidic telemetering device 22 may be seen to include signal transmitter means 24 and a signal receiver means 26 operably interconnected as shown by transmitting lines as indicated at 28 and 30. Input signal transmission means are indicated at 32 and are effective to transmit signals indicative of the quantity of water utilized from the water meter 16 to the device transmitting means 24, and output signal transmitting means are indicated at 34 and are similarly effective to transmit output signals, again indicative of the quantity of water utilized, from the device receiver means 26 to the counter means 18 to actuate the latter.

Preferably, each of the water meter 16, the input signal transmission means 32 and the signal transmitter means 24 are enclosed as illustrated by a protective cover or enclosure 35 and, in like manner, the counter means 18, output signal transmission means 34 and the signal receiver means 26 are preferably enclosed by a protective cover or enclosure 37.

Thus, briefly described, the operation and function of the fluidic telemetering device 22 of the invention, as depicted and briefly described in conjunction with FIG. 1, may be understood to constitute the transmission of signals indicative of the quantity of water utilized from the water meter 16 to the externally disposed counter means 18 to actuate the latter to provide indicia of water quantity utilization on the counter means dial face 20 and thus enable convenient read-out of the internally disposed meter 16 from without the building 10 to thereby render unnecessary access to the said building for performance of the meter reading function.

Figure 2:
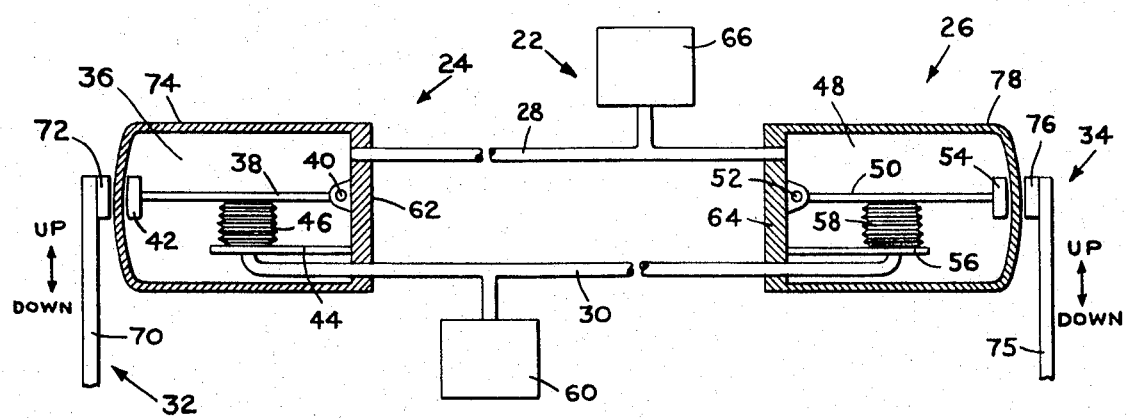
FIG. 2 is a more detailed schematic diagram of the fluidic telemetering device of FIG. 1.

Referring now to the more detailed schematic showing of the fluidic telemetering device 22 of the invention in FIG. 2, the transmitter means 24 may be seen to comprise a hermetically sealed chamber 36 within which is disposed a vane 38 which is hinged as shown at one extremity thereof as indicated at 40. Magnetic means 42 which preferably take the form of any suitable, high-strength permanent magnet are supported from the opposite extremity of the vane 38. A bellows mounting plate is indicated at 44, and hermetically sealed bellows 46 are mounted on the mounting plate 44. The bellows 46 extend as indicated between the said mounting plate and the vane 38 and are attached, in any convenient manner, to the undersurface of the latter. By this construction it is believed made clear that any generally upwardly or downwardly directed pivotal movement of the vane 38 about its hinge point 40 will in turn result in expansion or contraction of the bellows 46, depending of course upon the direction of such movement, and that this resultant expansion or contraction of the said bellows will in turn result in a corresponding, albeit temporary, change in the pressure of the fluid entrained therein.

In the manner of the transmitter means 24, the receiver means 26 comprise a hermetically sealed chamber 48 within which is pivotally mounted a vane 50 from a hinge as indicated at 52. Magnetic means 54 which preferably take the same high-strength, permanent magnet form as the magnetic means 42, are supported from the extremity of the vane 50 which is opposite to the hinged extremity thereof. A bellows support plate 56 is provided within the chamber 48, and a hermetically sealed bellows 58 may be seen to be supported thereby and extend therefrom for attachment to the undersurface of the vane 50. By this construction, it is believed made clear that any expansion or contraction of the bellows 58, as occasioned by relative changes between the fluid pressure in the said bellows, and the fluid pressure in the hermetically sealed chamber 48, will result in corresponding generally upwardly or downwardly directed pivotal movement of the vane 50 about its hinge point 52, with attendant pivotal movement of the magnetic means 54 about the said hinge point as should be obvious.

The fluidic pressure transmitting line 30 may include a plenum chamber 60 formed therein, and the said balancing line extends as shown to connect the interior of the bellows 46 with the interior of the bellows 58. More specifically, it may be noted that the transmitting line 30 extends from the interior of bellows 46 through the bellows support plate 44 and therefrom to and through the end wall 62 of the chamber 36. Therefrom the transmitting line 30 extends to and through the end wall 64 of the hermetically sealed chamber 48, and thence to and through the bellows support plate 56 into communication with the interior of bellows 58. Since all balancing line-bellows connections are also hermetically sealed, it may be understood that the bellows system comprising bellows 46 and 58, and the transmitting line 30, is a hermetically sealed system.

With this construction, the fluidic pressure transmitting or balancing line 30 will function to maintain substantial pressure equilibrium within the respective interiors of the bellows 46 and 58, and it may be understood that any contraction or expansion of the bellows 46, in response to pivotal movement of the vane 38, will be directly transmitted to bellows 58 to result in corresponding expansion or contraction of the latter, it being assumed that the respective dimensions of bellows 46 and 58 are substantially equal. This is to say that should the vane 38 be pivotally moved downwardly about its hinge 40 to result in contraction of the bellows 46 with attendant, temporary increase in the pressure in the latter, this downward movement of the vane 38 will be transmitted, in the form of a fluid pulse, through transmitting or balancing line 30 to result in a corresponding, temporary increase in the pressure in bellows 58 which will in turn effect corresponding expansion in the volume of the latter with attendant upwardly directed pivotal movement of the vane 50, to once again very shortly equalize the respective fluidic pressures within the said bellows.

Fluidic pressure transmitting or balancing line 28 may also include a plenum chamber 66 formed therein, and the said balancing line may be seen to communicate the respective interiors of the hermetically sealed transmitter chamber 36 and receiver chamber 48 by the extension of the said balancing line through the respective chamber end walls 62 and 64. Since the respective balancing line-transmitter and receiver chamber connections are also hermeticaly sealed, it may be understood that the chamber system comprising transmitter chamber 36 and receiver chamber 48, and balancing line 28 will also be a hermetically sealed system, and one which is distinct and independent from the hermetically sealed bellows system as discussed hereinabove.

If the above-described condition is considered wherein the bellows 46 are somewhat contracted and the bellows 48 resultantly expanded to a corresponding degree as a result of the fluidic pressure transmitting or balancing function of the transmitting line 30, the fluidic pressure transmitting or balancing line 28 will function to compensate therefor by enabling the fluid displaced in the receiver chamber 48 by the expansion of the bellows 58 to flow into the transmitter chamber 36 to in essence fill the void created therein by the contraction of the bellows 46 and thus maintain substantial pressure equalization between the respective transmitter and receiver chambers 36 and 48.

If inclined, the respective plenum chambers 60 and 66 can be so sized relative to the respective transmitter and receiver chambers 36 and 48, to provide that for a given temperature range the entire system will be substantially independent of variations in temperature. This is to say that the said plenum chambers would be so sized that the pressure in the respective bellows and receiver and transmitter chambers would be substantially identical over a relatively wide temperature range. Alternatively, the effects of temperature variations over a given temperature range can be considered in detail, and substantially negated, by initially sizing the respective transmitter and receiver chambers and bellows to be of sufficient volume to compensate for temperature variations within a given range and thereby enable the elimination of the said plenum chambers.

Since each of the respective transmitter chamber 36 and the receiver chamber 48 are hermetically sealed, as are each of the hereinabove described connections of the respective fluidic pressure transmitting or balancing tubes 28 and 30, and since all of the components of the device with the exception of the bellows 46 and 58, that is to say the respective walls or housings which form the transmitter and receiver chambers, and the said balancing tubes, are of rigid construction, it may readily be understood that the telemetering device 22 will be substantially independent of external pressure variations, whereby any change in the volume of the bellows 46 will, of necessity, be accompanied by an equal, although oppositely directed, change in the volume of bellows 58.

As depicted in FIG. 2, it may be seen that the input signal transmitting means 32 comprise an input signal transmission arm 70 having magnetic means 72, in the nature of magnetic means 42, attached to the extremity thereof adjacent the transmitter chamber 36. More specifically, it may be seen that the magnetic means 72 are disposed relative to the transmitter chamber 36 so that the former are substantially opposite the magnetic means 42 of the vane 38 and are separated therefrom only by the housing or wall 74 of the transmitter chamber 36 which would, of course, be constructed from any suitably non-magnetic material. The respective magnetic means 42 and 36 are, of course, of opposite polarity to thus provide for a magnetic coupling between the arm 70 and the vane 38. In practice, the device would preferably be arranged so that the magnetic means 72 are disposed as closely as possible to the housing or wall 74 to enable relative movement therebetween without magnetic means-wall contact and, in like manner, it may be understood that the magnetic means 42 are disposed as closely as practical to the interior surface of the wall 74 for similar purpose.

With this construction, it is believed clear than any movement of the input signal transmission arm 70 relative to the transmitter chamber 36, in the upward or downward directions as indicated by the directional arrow, will be accompanied by corresponding pivotal movement of the vane 38 about its hinge point 40 as a result of the magnetic coupling between the respective magnetic means 72 and 42 of opposite polarity as discussed hereinabove.

In the manner of input signal transmission means 32, the output signal transmission means 34 comprise arm 75 having magnetic means 76 affixed to the extremity thereof adjacent the non-magnetic wall 78 of the receiver chamber 48. The magnetic means 76 are coupled to the magnetic means 54 so that pivotal movement of the latter will result in substantially corresponding upwardly or downwardly directed movement of the output signal transmission arm 75.

For use in a remote read-out system as depicted in FIG. 1, it may be understood that the input signal transmission arm 70 would be affixed or otherwise operably associated with the water quantity utilization indicating means of the water meter 16. In such manner that movement of the said input arm would be indicative of the quantity of water utilized.

More specifically, the arm 70 may be arranged relative to the water quantity utilization indicating means of the water meter 16 so that the former would be moved or reciprocated through one cycle as a result of the utilization of each predetermined quantity of water. Thus, if it is assumed for purposes of example only that the input signal transmission arm 70 will be moved upwardly from an initial position thereof to a predetermined extent and then moved downwardly to the said initial position thereof in response to the utilization of a predetermined quantity of water, it may be understood that the extremity of vane 38 to which the magnetic means 42 are affixed will concomitantly be pivotally moved upwardly and downwardly to a substantially corresponding extent.

During this upward movement of the vane 38, the bellows 46 will, of course, be expanded with resultant, and substantially coersponding contraction of the bellows 58 due to the combined effects of the fluidic pressure transmitting or balancing line 30 which connects the said bellows, and the fluidic pressure transmitting or balancing line 28 which connects the respective transmitter and receiver chambers 36 and 48 as described in detail hereinabove. In like manner, the subsequent downward movement of the vane 38 with attendant contraction of the bellows 46 will, of course, result in corresponding expansion of the bellows 58 with attendant, substantially corresponding upward movement of the vane 50 and the magnetic means 54.

By virtue of the magnetic coupling between the magnetic means 54 and 76 of opposite polarity, this cyclical, or substantially reciprocatory downward and upward movement of the magnetic means 54 will be transmitted through the housing or wall 78 of receiver chamber 48 to result in substantially corresponding reciprocatory movement of the output signal transmitting arm 74 downwardly from an initial position thereof to substantially the same extent as that covered by the initial upward movement of the input signal transmitting arm 70, and the subsequent upward movement of the output signal transmitting arm 74 to return the same substantially to the initial period thereof. Referring again to FIG. 1, if the output signal transmitting arm 74 is affixed or otherwise operably associated with the mechanical counter means 18 in such manner that each reciprocation of the former through a cycle constituted by downwardly and then upwardly directed movement, will function to advance the counter dial or indicating means 20 one unit, it may be understood whereby the fluidic telemetering device 22 of the invention will function to accurately advance the counter dial or indicating means 20 one unit for the utilization of each predetermined quantity of water as measured by the water meter 16 to thus enable the remote, albeit consistently accurate, periodic read-out of the same meter without the necessity for period access to the building 10.

By the above, it is believed made clear whereby is provided a fluidic telemetering device having a high degree of accuracy and reliability of performance, minimal servicing requirements, absolute independence from electrical power, be it line or battery provided, as a source of operating energy, and which is of such markedly simple and inexpensive construction that the production and installation costs thereof will be more than offset by the elimination of the high labor costs of paying repeated visits to a building in order to gain access thereto for the performance of a simple meter reading function.

Preferably, and for reasons of simplicity of manufacture and reliability of operation, the fluid in the respective bellows and transmitter and receiver chamber systems is air at atmospheric pressure which is simply entrapped therein during the manufacture of the fluidic telemetering device of the invention. Alternatively, the said fluid may be air or any other suitable gas at a system equilibrium pressure which is higher or lower than atmospheric and it is to be understood that the fluid in the bellows system need not be the same as the fluid in the transmitter and receiver chamber system, and that the said fluids need not, in any event, be at the same pressure. Too, since the said systems are always substantially pressure balanced, it may be understood that one, or two different, liquids may be employed at the respective system fluids.

Various modifications may of course be made in the fluidic telemetering device of the invention as disclosed hereinabove. Thus, for example, it is believed clear that none of the respective bellows 46 and 58, and the transmitter chamber 36 and receiver chamber 48 need be of the same volume of size. More specifically, it may be understood that if, for example, bellows 58 is made larger in diameter and volume than bellows 46, the extent of movement of vane 50 in response to movement of vane 38 will be smaller than if the said bellows diameters and volumes are made equal. No difficulty would be presented, however, by bellows diameter or volume differences in that proper calibration of the fluidic telemetering device and of the respective input and output devices to be associated therewith will, of course, be operative to compensate for any differences in the extent of movement of output signal transmitting arm 74 relative to the extent of movement of input signal transmitting arm 70. Too, it is believed clear that one or both of the respective bellows 46 and 58 may, of course, be replaced by diaphrams which extend across the respective transmitter chamber 36 and receiver chamber 48, as the case may be, to in essence divide the same into first and second fluid tight chambers, and the respective vanes 38 and 50 affixed in any convenient manner, preferably to the central portions of the said diaphragms, to be movable therewith in response to the input signals as discussed hereinabove.

Further, the respective input and output signal transmitting arms 70 and 74 may be disposed to extend within the respective transmitter chamber 36 and receiver chamber 48 and magnetically coupled within the said chambers with the respective magnetic means 42 and 54 of the vanes 38 and 50. Alternatively, in instances wherein said input and output arms are disposed within the said transmitter and receiver chambers, the magnetic couplings may be eliminated and the said arms coupled to the said vanes via mechanical coupling means in the nature, for example, of gear trains or mechanical linkages. Whether the output signal transmitting arm 74 is disposed externally of the receiver chamber 48 as depicted, or internally thereof as discussed hereinabove, the coupling between the said arm and the hinged vane 50 rather than being magnetic or mechanical may alternatively take the form of a photoelectric coupling which will enable the transmission of signals between the vane 50 and the output signal transmission means 34. In such instance, the magnetic means 54 would be replaced by a light source, and the magnetic means 76 and arm 75 by a photoelectric device which would be sensitive to the sweeping thereof by the light from the said light source to provide output signals indicative thereof. In such instance, it may readily be understood that those portions of the receiver housing or wall 78 which would be disposed between the said light source and photoelectric device would be made of a transparent plastic or glass, or would contain a window area made of such material, whereby the transmission of signals by photoelectric means would be made possible. The use of such photoelectric output signal transmission means would, however, not be preferable for remote water meter read-out applications of the device because the former would obviously require a source of electrical operating energy.

Although disclosed in detail hereinabove as functioning to operate mechanical counter means at a remote location in response to the operation of a water meter, it is to be clearly understood that the fluidic telemetering device of the invention is suitable for use in any one of a wide variety of applications wherein it is desired to accurately and reliably transmit a signal from signal generating means to remotely disposed signal indicating or signal utilization means. This is to say that the fluidic telemetering device of the invention would be applicable to the transmission of signals for remote utilization in a manner different from the actuation of counter or other signal recording means. In this latter regard, a remote control system is, for example, one application which should readily come in mind.

It will be apparent that many modifications and variations in addition to those specifically noted hereinabove may be effected in the described embodiment without departing from the spirit and scope of this invention as defined in the appended claims.

What is claimed is:

1. In a fluidic telemetering device for the transmission of signals between input signal transmission means and remotely disposed output signal transmission means, the improvements comprising, a hermetically sealed chamber system comprising a transmitter chamber cooperatively associated with said input signal transmission means, and a receiver chamber cooperatively associated with said output signal transmission means, and first balancing line means connecting said transmitter and receiver chamber, an independently hermetically sealed pressure responsive means system comprising first, variable volume pressure responsive means disposed in said transmitter chamber, second, variable volume pressure responsive means disposed in said receiver chamber, and second balancing line means connecting said first and second variable volume pressure responsive means to maintain substantial pressure equality therebetween whereby changes in volume in one of said variable volume pressure responsive means will be accompanied by generally corresponding, but oppositely directed changes in volume in the other of said variable volume pressure responsive means, means coupling said input signal transmission means to said first variable volume pressure responsive means for varying the volume of the latter in accordance with said input signal and thereby varying the volume of said second variable volume pressure responsive means accordingly, said variation in the volume of said second variable volume pressure responsive means causing a momentary disruption of pressure equilibrium in said transmitter chamber and receiver chamber respectively, said disruption being corrected by means of said first balancing line means and means coupling said second variable volume pressure responsive means to said output signal transmission means to transmit output signals to the latter in accordance with said variations in volume in said second variable volume pressure responsive means.

2. In a fluidic telemetering device as in claim 1 wherein said input signal transmission means comprise means which are cooperatively associated with fluid meter means and are adapted to transmit an input signal in response to the utilization of a predetermined quantity of fluid as determined by said fluid meter means.

3. In a fluidic telemetering device as in claim 1 wherein said first and second, variable volume pressure responsive means respectively comprise bellows means, said means coupling said input signal transmission means to said first variable volume pressure responsive means comprise pivotally mounted vane means disposed within said transmitter chamber and operative to vary the volume of said bellows means disposed therewithin in accordance with said input signals, and said means coupling said second variable volume pressure responsive means to said output signal transmission means comprise pivotally mounted vane means disposed within said receiver chamber and operative in response to changes in volume in said bellows means disposed therewithin to transmit output signals to said output signal transmission means.

4. In a fluidic telemetering device as in claim 1 wherein said first and second, variable volume pressure responsive means are respectively constituted by single bellows.

5. In a fluidic telemetering device as in claim 4 wherein said means coupling said input signal transmission means to said first variable volume pressure responsive means comprise vane means which are pivotally mounted in said transmitter chamber and are operative to change the volume of said bellows disposed therewithin in response to said input signals, and said means coupling said second variable volume pressure responsive means to said output signal transmission means comprise vane means which are pivotally mounted in said receiver chamber and are operative to be pivotally moved in response to changes in volume in said bellows disposed therewithin to transmit output signals to said output signal transmission means.

6. In a fluidic telemetering device as in claim 5 wherein said input signal transmission means comprise arm means which are cooperatively associated with water meter means and are adapted to be reciprocated through one cycle of movement in response to the utilization of a predetermined quantity of water as determined by said water meter means, and said output signal transmission means are constituted by arm means which are cooperatively associated with counter means and are adapted to be reciprocated through one cycle of movement in response to said reciprocation of said input signal transmission means to advance said counter means one unit in response to the utilization of each said predetermined quantity of fluid as determined by said fluid meter means.

7. In a fluidic telemetering device as in claim 6 wherein said signal transmission arms are disposed without said respective transmitter and receiver chambers, and said coupling means further comprise magnetic means cooperatively associated with said arms and each of said vanes and operable, in each instance, to magnetically couple the same for the transmission of signals therebetween.

References Cited
UNITED STATES PATENTS

| | | | |
|---|---|---|---|
| Re.238,800 | 3/1954 | Dufour | 235—91 |
| 2,858,982 | 11/1958 | Greenwood et al. | 235—91 |
| 2,858,983 | 11/1958 | Holtz et al. | 235—91 |
| 3,162,491 | 12/1964 | Van Winsen | 60—54.5 |
| 3,352,488 | 11/1967 | Greene | 235—91 |
| 2,993,965 | 7/1961 | Morgan | 60—54.5 R |
| 3,032,993 | 5/1962 | Cole | 60—54.5 R |

MARTIN P. SCHWADRON, Primary Examiner

A. M. ZUPCIC, Assistant Examiner

U.S. Cl. X.R.

235—91 R